(12) United States Patent
Salimi et al.

(10) Patent No.: US 12,370,762 B2
(45) Date of Patent: Jul. 29, 2025

(54) IN-MOLD REFERENCE MARKERS TO ENHANCE THE CALIBRATION OF OPTICAL SYSTEMS IN MANUFACTURING WIND TURBINE BLADES

(71) Applicant: TPI Technology Inc., Scottsdale, AZ (US)

(72) Inventors: Amir Salimi, Providence, RI (US); Alexander Segala, Rehoboth, MA (US)

(73) Assignee: TPI Technology Inc., Scottsdale, AZ (US)

( * ) Notice: Subject to any disclaimer, the term of this patent is extended or adjusted under 35 U.S.C. 154(b) by 187 days.

(21) Appl. No.: 18/224,915

(22) Filed: Jul. 21, 2023

(65) Prior Publication Data

US 2024/0025138 A1 Jan. 25, 2024

Related U.S. Application Data

(60) Provisional application No. 63/369,128, filed on Jul. 22, 2022.

(51) Int. Cl.
*B29C 70/54* (2006.01)
*G01D 18/00* (2006.01)

(52) U.S. Cl.
CPC ........... *B29C 70/541* (2013.01); *G01D 18/00* (2013.01); *G01D 2218/00* (2021.05)

(58) Field of Classification Search
CPC .. B29C 70/541; G01D 18/00; G01D 2218/00; B29D 99/0028; B29L 2031/085
See application file for complete search history.

(56) References Cited

U.S. PATENT DOCUMENTS

| 5,651,600 | A | 7/1997 | Dorsey-Palmateer |
| 11,046,033 | B2 * | 6/2021 | Hull ...................... B29C 70/742 |
| 2008/0279971 | A1 * | 11/2008 | Wilkerson ............. G01B 11/14 |
| | | | 425/150 |
| 2019/0001589 | A1 | 1/2019 | Salimi et al. |
| 2021/0276287 | A1 | 9/2021 | Hull |

FOREIGN PATENT DOCUMENTS

WO WO-2022/008669 A1 1/2022

OTHER PUBLICATIONS

International Search Report and Written Opinion for International Application No. PCT/US2023/028368 dated Oct. 3, 2023.

* cited by examiner

*Primary Examiner* — Nahida Sultana
(74) *Attorney, Agent, or Firm* — Stephen J. Kenny; Foley Hoag LLP

(57) ABSTRACT

A method for fabrication of a composite structure including providing a mold configured for forming a composite structure, providing at least one magnetic anchor, the at least one magnetic anchor disposed within the mold, providing at least one optical marker, the optical marker magnetically coupled to the at least one magnetic anchor, providing an optical projector, the optical projector projecting at least one optical beam directed towards at least one optical marker, receiving at least one reflective beam from the at least one optical projector to identify the location of the optical marker disposed on the mold, calibrating the optical projector by comparing a predetermined virtual optical marker location to the identified optical marker location.

20 Claims, 11 Drawing Sheets

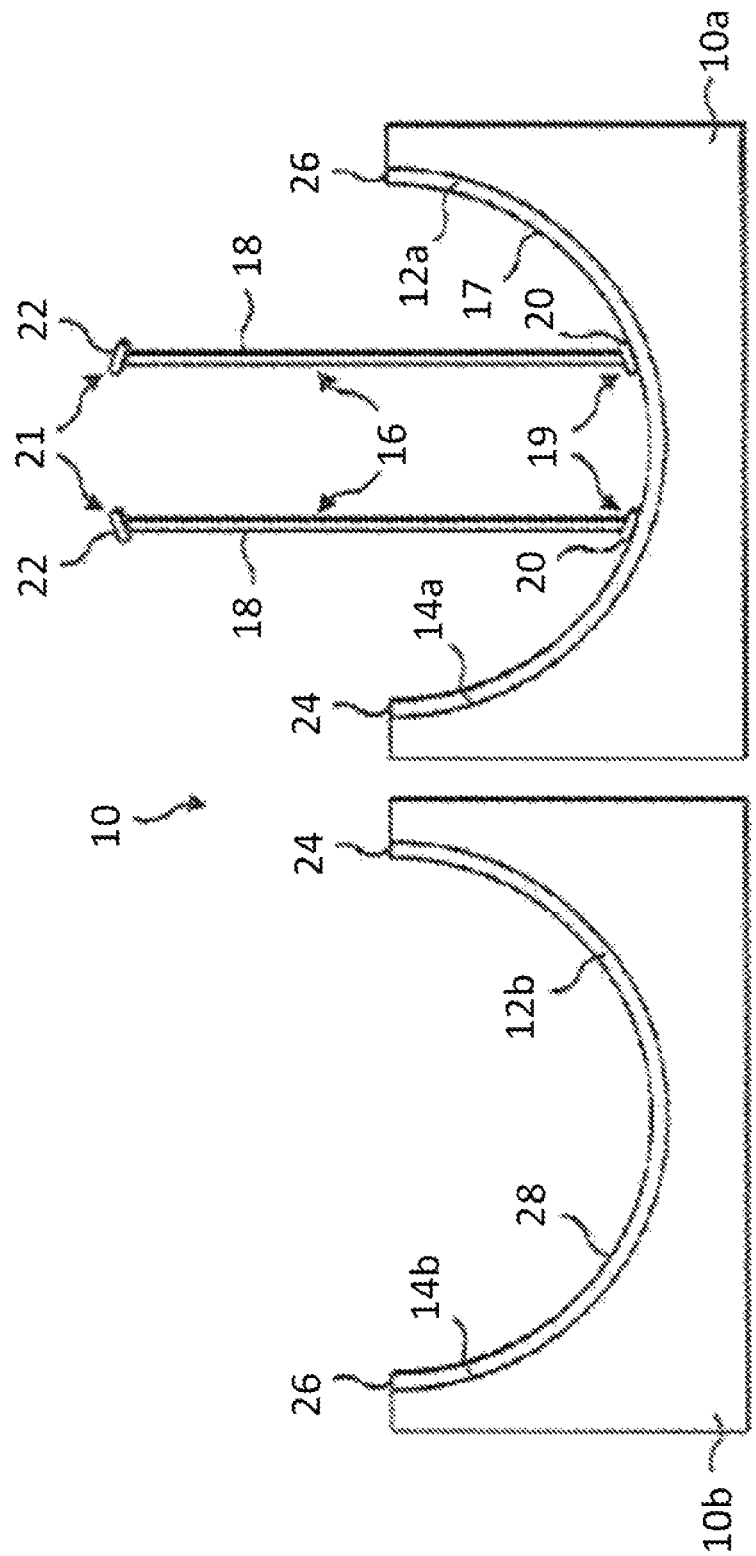

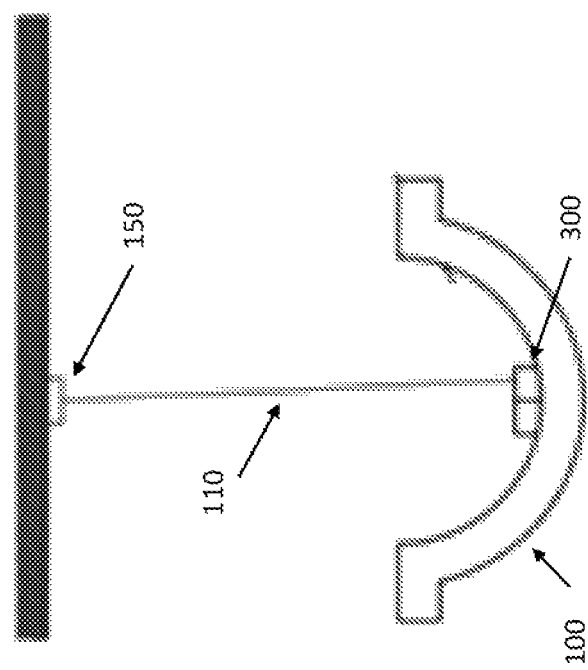

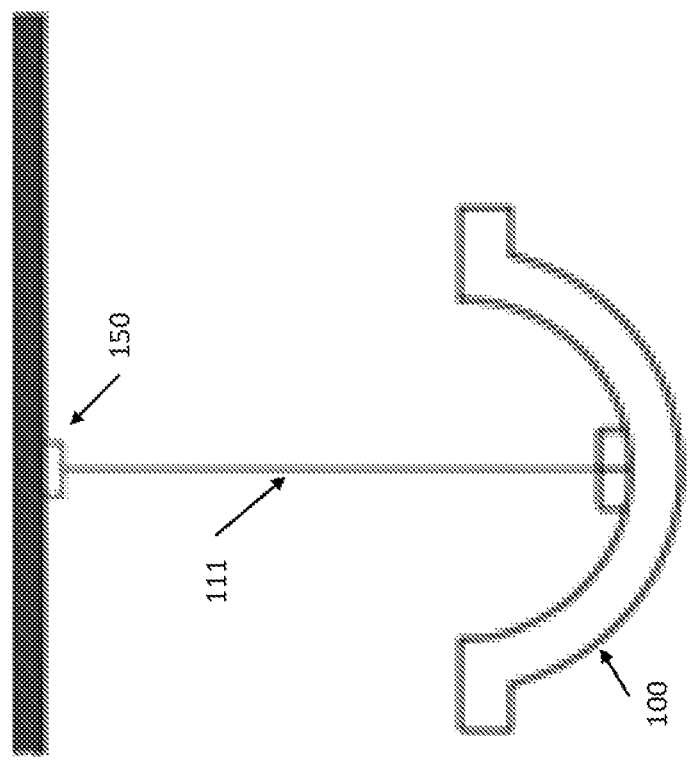

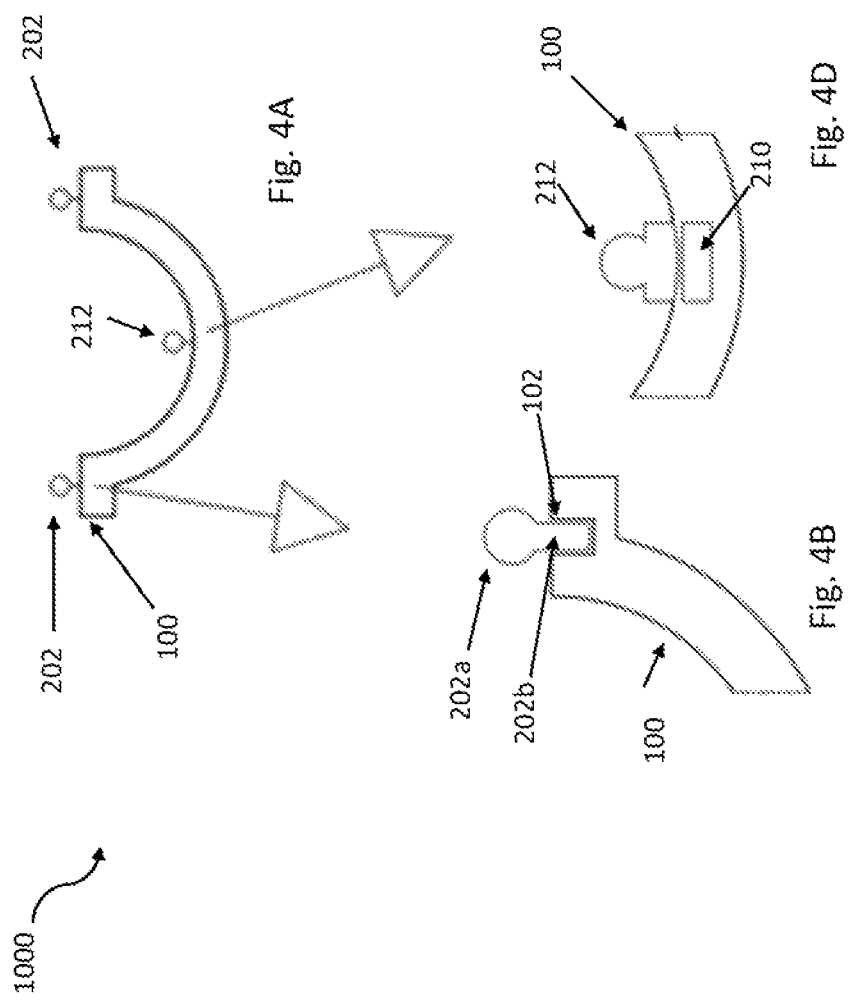

IN-MOLD REFERENCE MARKERS TO ENHANCE THE CALIBRATION OF OPTICAL SYSTEMS IN MANUFACTURING WIND TURBINE BLADES

CROSS REFERENCE TO RELATED APPLICATIONS

This application claims priority to U.S. Provisional Patent Application No. 63/369,128 filed on Jul. 22, 2022, the entire contents of which is hereby incorporated by reference herein.

THE FIELD OF THE DISCLOSED SUBJECT MATTER

The disclosed subject matter relates to a system, and corresponding method, of manufacturing large scale composite structures, e.g., wind turbine blades. These large-scale composite structures are typically formed from a two-piece mold which, once the blade halves are molded, require a complex component location/installation, and subsequent mold closure process, to complete fabrication.

Particularly, the present disclosure provides a mold that includes optical reference markers for calibrating optical systems (e.g., overhead laser projections into the mold) in manufacturing of wind turbine blades. Particularly, the present disclosure provides reflective optical markers inside the mold (and optionally, exterior of the mold as well), for calibrating digital reference points with physical reference points, in a manner that does not create any recess/void within the interior mold surfaces. This provides an accurate and precise assembly of blade components, e.g., shear webs, spar caps as well as composite layup segments. The calibration techniques disclosed herein can be employed with a variety of overhead projecting devices, and projected geometries, including the apparatus and techniques disclosed in U.S. Pat. Nos. 10,889,075 and 11,007,727, the entire contents of each are hereby incorporated by reference.

Wind turbine blades generally comprise a hollow blade shell made primarily of composite materials, such as glass-fiber reinforced plastic. The blade shell is typically made up of two half shells, a lower pressure-side shell and an upper suction-side shell, which are molded separately in respective female half molds, before being bonded together along flanges at the leading and trailing edges of the blade. An exemplary view of a mold half for a wind turbine blade is illustrated schematically in FIG. 1A-C.

Referring to FIG. 1a, this shows a mold 10 for a wind turbine blade divided into two half molds, an upper suction-side mold 10a and a lower pressure-side mold 10b, which are arranged side by side in an open configuration of the mold. A pressure side blade shell 12a is supported on a mold surface 14a of the lower mold 10a and a suction side blade shell 12b is supported on a mold surface 14b of the upper mold 10b. The shells 12a, 12b are each made up of a plurality of glass-fiber fabric layers, which are bonded together by cured resin.

After forming the shells 12a, 12b in the respective mold halves 10a, 10b, shear webs 16 are bonded to spar caps positioned on or within an inner surface 17 of the windward blade shell 12a. The shear webs 16 are longitudinally-extending structures that bridge the two half shells 12a, 12b of the blade and serve to transfer shear loads from the blade to the wind turbine hub in use. In the particular embodiment shown in cross-section in FIG. 1a, the shear webs 16 each comprise a web 18 having a lower edge 19 comprising, optionally, a first longitudinally-extending mounting flange 20 and an upper edge 21 comprising, optionally, a second longitudinally-extending mounting flange 22. Adhesive such as epoxy is applied along these mounting flanges 22 in order to bond the shear webs 16 to the respective spar caps of each half shell 12a, 12b.

As shown in FIG. 1B, once the shear webs 16 have been bonded to the upper blade shell 12a, adhesive is applied along the second (upper) mounting flanges 22 of the shear webs 16, and along the leading edge 24 and trailing edge 26 of the blade shells 12a, 12b. The upper mold 10b, including the upper blade shell 12b, is then lifted, turned and placed on top of the lower blade mold 10a in order to bond the two blade half shells 12a, 12b together along the leading and trailing edges 24, 26 and to bond the shear webs 16 to spar caps along an inner surface 28 of the upper blade shell 12b. The step of placing one mold half on top of the other is referred to as closing the mold.

Referring now to FIG. 1C, a problem can arise when the mold 10 is closed whereby the shear webs 16 may move slightly relative to the upper shell 12b. For example, the shear webs 16 may move slightly under their own weight during mold closing or they may be dislodged by contact with the upper shell 12b. Additionally or alternatively, the shear webs and spar caps can be inaccurately placed within the open mold halves prior to closing, resulting in a compromised or defective blade build. Furthermore, the concave curvature of the upper shell 12b also has a tendency to force the shear webs 16 together slightly, as shown in FIG. 1C. Such movement of the shear webs 16 during mold closing may result in the shear webs 16 being bonded to the spar caps and/or upper shell 12b at a sub-optimal position.

As blades are ever increasing in size in order to improve the operational efficiency of wind turbines, safety margins decrease thus requiring manufacturing acceptance criteria and tolerances to become stricter. This necessitates the design and implementation of manufacturing tools that enable high precision process checks to satisfy strict specifications and requirements.

The current disclosure introduces new tools and techniques to enable over-head optical projection systems to calibrate the digital/virtual coordinates of components (e.g. layup segments, spar caps, etc.) with actual physical coordinates which are identified via reflective optical markers, that are removably attached to the mold. Additionally, the removable markers are attached (e.g. magnetically) via anchors disposed within the mold, wherein the anchors are disposed below the outer surface of the mold, such that the mold surface is integral/contiguous thus avoiding the need to form an aperture/recess to receive the markers (and preventing unwanted resin ingress into such apertures).

The calibration described herein verifies the spatial positioning of the assembly components (e.g. layup segments, spar caps, core, etc.) confirming the desired assembly configuration—thus providing an efficient system for high precision placement of the internal components during the assembly of wind turbine blades, without impacting the structure of the mold or blades.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a method for fabrication of a composite structure comprising: providing a mold configured for forming a composite structure; providing at least one magnetic anchor, the at least one magnetic anchor disposed within the mold; providing at least one optical marker, the optical marker magnetically coupled to the at least one magnetic anchor; providing an optical projector, the optical projector projecting at least one optical beam directed towards at least one optical marker; receiving at least one reflective beam from the at least one optical projector to identify the location of the optical marker disposed on the mold; and calibrating the optical projector by comparing a predetermined virtual optical marker location to the identified optical marker location.

In some embodiments, the method also includes removing the at least one optical marker from the magnetic anchor.

In some embodiments, the method also includes depositing a plurality of layup segments within the mold after the at least one optical marker is removed.

In some embodiments, the method also includes injecting resin through the plurality of layup segments after the at least one optical marker is removed.

In some embodiments, the at least one layup segment is disposed above the magnetic anchor.

In some embodiments, the composite structure is a wind turbine blade.

In some embodiments, at least one magnetic anchor is disposed at a flange of a leading edge of the wind turbine blade.

In some embodiments, at least one magnetic anchor is disposed at a midpoint of a blade chord.

In some embodiments, at least one magnetic anchor is disposed at a blade location that coincides with a spar cap.

In some embodiments, a plurality of magnetic anchors are provided, the plurality of magnetic anchors disposed in the mold at locations that coincide with a maximum blade chord length.

In some embodiments, a plurality of optical markers are disposed between the leading and trailing edge of the blade.

In some embodiments, at least one magnetic anchor is disposed under the surface of the mold.

In some embodiments, at least one optical marker is configured as a mirror.

In some embodiments, the comparison of the predetermined digital optical marker location(s) and the identified physical optical marker location do not match, adjusting the predetermined digital optical marker location(s).

In some embodiments, projecting is performed by a plurality of lasers.

In some embodiments, the lasers are configured for relative movement with respect to the mold.

In some embodiments, the lasers are configured for relative movement with respect to each other.

In some embodiments, a plurality of optical beams are projected simultaneously towards a plurality of optical markers.

In some embodiments, select beams are projected in a serial fashion.

In some embodiments, the optical markers are removed from the wind turbine blade surface prior to closing a first mold half onto a second mold half.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIGS. 1A-C depict cross-sectional views of a conventional wind turbine blade mold and manufacturing method.

FIGS. 2A-C are exemplary views of optical reference markers located along the mold flange, in accordance with an embodiment of the disclosed subject matter.

FIGS. 3A-C are exemplary views of optical reference markers located at multiple locations within the interior of the mold, in accordance with an embodiment of the disclosed subject matter.

FIGS. 4A-E are exemplary views of optical reference markers located along the mold flange, as well as within the interior of the mold, in accordance with an embodiment of the disclosed subject matter.

DETAILED DESCRIPTION OF AN EXEMPLARY EMBODIMENT

Figure 1B:
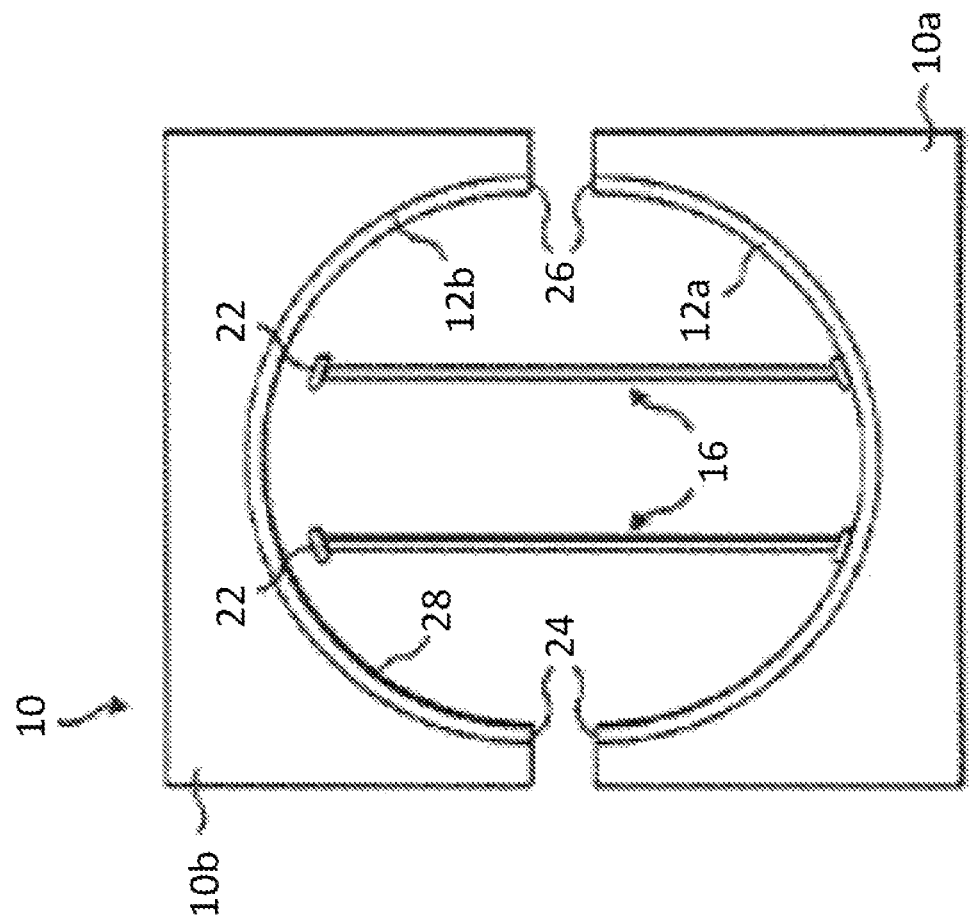
Figure 1C:
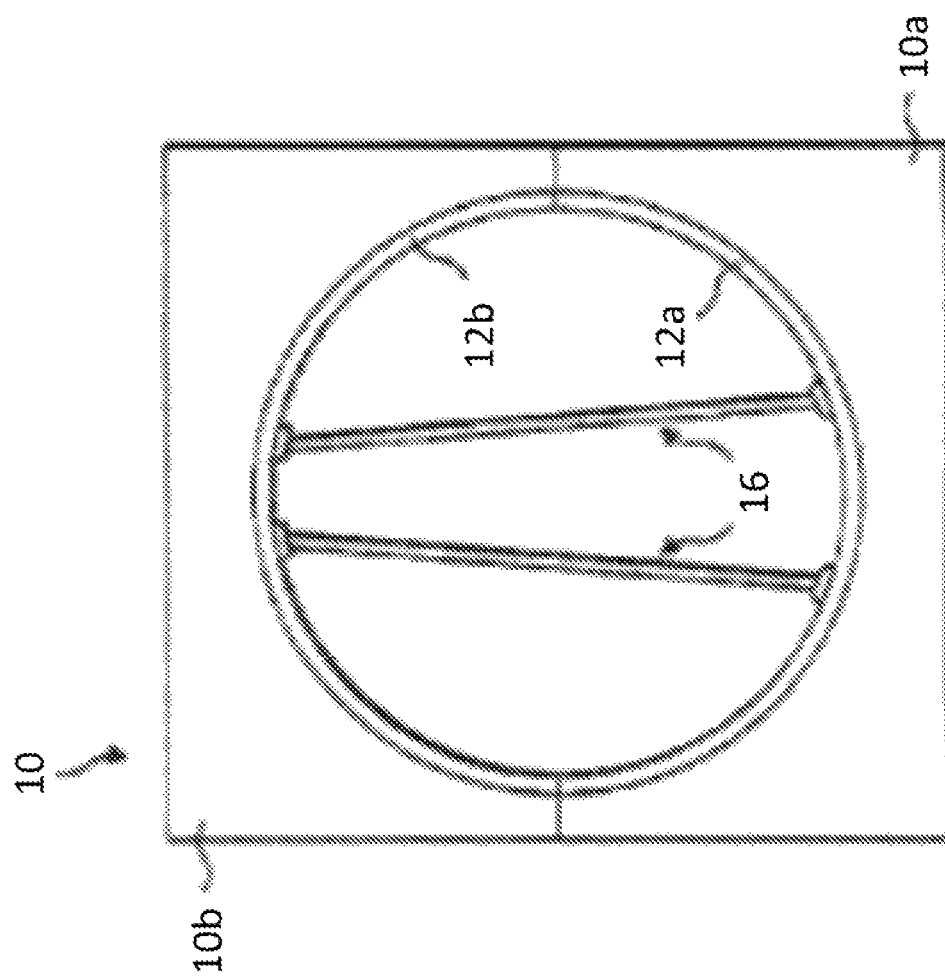

Reference will now be made in detail to exemplary embodiments of the disclosed subject matter, an example of which is illustrated in the accompanying drawings. The method and corresponding steps of the disclosed subject matter will be described in conjunction with the detailed description of the system.

The methods and systems presented herein may be used for composite structure construction—e.g., automotive components, marine components and construction components, etc. The disclosed subject matter is particularly suited for construction of wind turbine blades. For purpose of explanation and illustration, and not limitation, an exemplary embodiment of the system in accordance with the disclosed subject matter is shown in FIGS. 2-4C and is designated generally by reference character 1000. Similar reference numerals (differentiated by the leading numeral) may be provided among the various views and Figures presented herein to denote functionally corresponding, but not necessarily identical structures.

A wind turbine blade can be formed from two shells or "skins", each of which is made by a plurality of layers of composite segments (or "layups") that are placed within a mold, and thereafter infused with resin, in various embodiments, via a vacuum infused resin transfer method (VARTM). Additionally, or alternatively, the blade shells/skins can be formed with pre-formed or "pre-preg" layup segments.

A blade may include one or more structural components configured to provide increased stiffness, buckling resistance and/or strength to the blade. For example, the blade may include one or more longitudinally extending spar caps configured to be engaged against the opposing inner surfaces of the pressure and suction sides of the blade, respectively. Additionally, one or more shear webs may be disposed between the spar caps so as to form a beam-like configuration. The spar caps may generally be designed to control the bending stresses and/or other loads acting on the blade in a generally spanwise direction (a direction parallel to the span of the blade) during operation of a wind turbine. Similarly, the spar caps may also be designed to withstand the spanwise compression occurring during operation of the wind turbine.

The spar caps of the present disclosure can be constructed of a plurality of pultruded members grouped together to form a first portion of the spar caps. In certain embodiments, the pultruded members may be formed by impregnating a plurality of fibers (e.g., glass or carbon fibers) with a resin and curing the impregnated fibers. The fibers may be impregnated with the resin using any suitable means. Further, the resin may include any suitable resin material, including but not limited to polyester, polyurethane, polybutylene terephthalate (PBT), polyethylene terephthalate (PET), vinyl ester, epoxy, or similar. Further, as shown, the pultruded members may separate into one or more pultruded member bundles as the spar cap approaches the blade root so as to form a second portion of the spar cap.

More specifically, the spar cap is constructed of a plurality of pultruded members grouped together to form one or more layers. Thus, the layers may be stacked atop one another and joined together using any suitable means, for example, by vacuum infusing the members together or by bonding the members together via an adhesive, a semi-preg material, a pre-preg material, or similar.

The present disclosure introduces new tools and techniques to enable over-head optical (e.g., laser) projection systems to provide calibration and alignment of optical projectors with the mold surface, to thereby verify the exact assembly of components (e.g., layup segments, spar caps, shear webs, core, etc.). In various embodiments, the optical projection system may be a laser-based optical system, configured to emit a laser beam. In various embodiments, the optical projection system may be a, moveable (vertically and/or laterally) light-emitting system in any wavelength of electromagnetic spectrum, including visible light. In various embodiments, the optical projection system may be located at any point relative to the mold components. One of skill in the art would appreciate that 'over-head' is only an exemplary embodiment of the disclosed system and does not seek to limit the location of the projection system or orientation thereof.

A laser projection system configured to assist with the molding process in fabrication of wind turbine blades may require calibration and alignment of projectors (or the lines displayed therefrom, such as layup edges to guide installation of layup segments, spar cap location, etc.) with respect to the actual/physical mold surface(s). Upon successful completion of this step, digital 3D patterns of the blade components are properly projected inside the mold, providing the level of precision required to support the composite layup process.

To calibrate the overhead laser projection system, actual geometric reference points are required to host the optical markers. These geometric reference points may be formed as target points. In various embodiments, these reflective target points can be formed as flat mirrors mounted in a plastic casing, enable the projector to map the 3D model (projection pattern) coordinates to their actual position in the mold workspace. In various embodiments, a minimum of 6 target points may be used. In various embodiments, more markers may be used, wherein more markers may improve the accuracy of the system. According to embodiments, the plurality of optical markers (target points) may be placed in a mold in a custom pattern according to the shape and application of the mold and the part manufactured therewith. According to embodiments, the plurality of optical markers (target points) may be placed in a mold in a pattern corresponding to one or more internal components or locations of the blade to be built. For example, and without limitation, the plurality of optical markers (target points) may be clustered around (e.g. forward/aft along blade span; laterally along blade chord) certain contours of the blade and around intended spar cap locations or other internal bracing components. According to embodiments, the plurality of optical markers may be arranged in a mold in a grid pattern, linearly, clustered or in a custom configuration corresponding to contours of the mold. The plurality of optical markers may be placed in the mold according to instructions generated by one or more computers, processors, computer-aided design applications, and/or the like, in embodiments. In various embodiments, the plurality of markers (target points) may be placed in a mold corresponding to one or more analyses, such as Finite Element Analysis (FEA). The plurality of optical markers may be placed in the mold by a human user or plurality thereof.

In some embodiments of the present disclosure, the laser projection system includes a coordinate mapping algorithm inside its processor, which can create the coordinate system by conducting an iterative best fit algorithm based on the spatial data received from the markers. The iterations can be targeted to find the coordinate system that minimizes the root-mean-square deviation of the actual (physical) versus estimated (digital) location of the target points. Therefore, the accuracy of the estimated positions is the most accurate in the vicinity of the physical markers and it declines as the distance from the physical reference point(s) increases. Each projector forms its local coordinate system and project the contours accordingly.

Retroreflective Optical Markers

The methods and systems described herein facilitate high precision component placement, e.g., spar caps, during molding processes. Particularly, the present disclosure introduces an apparatus and method which provides accurate geometric references throughout the blade span, and across the blade chord. The present disclosure can include over-head optical projection and laser tracking systems to assist in locating and measurement tools to place components and reinforcement layers (or "layup" kitting segments) during layup processes.

Figure 2A:
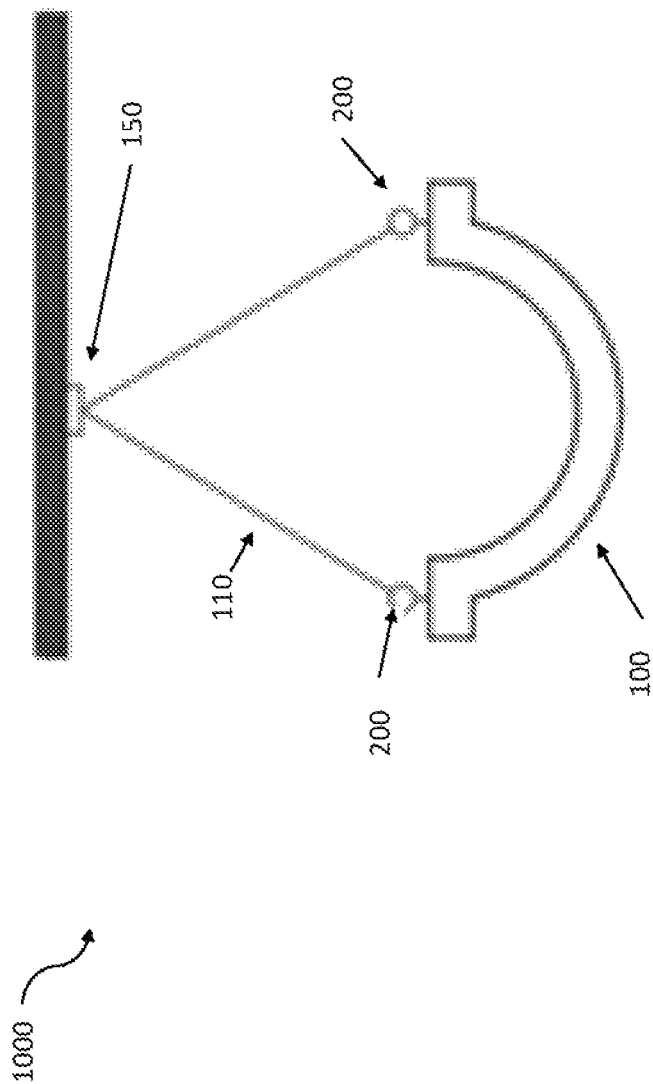
Figure 2B:
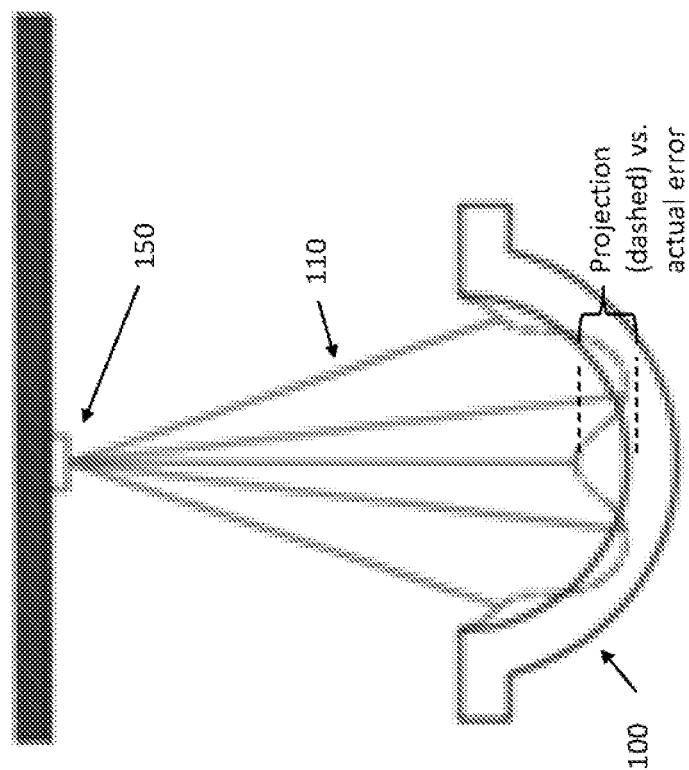

FIG. 2A depicts a longitudinal (i.e., spanwise view from root to tip) cross-sectional schematic of a blade half, with a plurality of markers 200 distributed along the blade span. The markers 200 can be configured as retroreflective optical markers which are positioned on the interior or exterior surface of the mold 100, that reflects radiation (e.g., light) back to its source 150 with minimum scattering. In some embodiments, the illumination source is one or more overhead optical (e.g., laser) projectors. In various embodiments, ach projector 150 can project a plurality of beams 110, with each beam dedicated and directed towards a single marker 200. In various embodiments, the trajectory of beams 110 can be adjusted to irradiate a plurality of markers 200. In various embodiments, each projector 150 can project a plurality of beams 110 toward a plurality of optical markers. In various embodiments, each projector 150 can project a plurality of beams 110 toward a subset of the optical markers. In various embodiments, each projector 150 can project a plurality of beams 110 at a single optical marker. For the purposes of this disclosure, each projector 150 can be capable of targeting any one or more optical markers in its field of view in the mold. The relative coordinates of the overhead projector(s) can be fixed with respect to the blade mold during the manufacturing process. Similarly, in various embodiments, the overhead projectors(s) remain fixed during operation; conversely, in some embodiments the overhead projectors can be adjusted (e.g. laterally, longitudinally and vertically such as lowered towards the mold).

In the embodiments shown in FIG. 2A, the markers 200 are housed within bushing holes and located on the mold flanges. In some embodiments, the markers 200 can be moved (or detached/replaced) relative to the stem on which the marker is mounted. In some/all embodiments, the orientation of the markers 200 (e.g. pitch/angle relative to the mold surface) can be adjusted (so that the marker reflects the beam at a predetermined angle of incidence). Since the location of these reference points are outside the edge of part to be formed (i.e., exterior to wind turbine blade, and exterior the closed mold when the upper half is positioned on the lower mold half shown), there are no interferences between the markers 200 and the blade manufacturing processes, e.g., layup or infusion. In other words, since the markers are only positioned outside the mold, they do not inhibit or interfere with the manufacturing processes occurring inside the mold.

However, the accuracy of the projection lines 110 declines as distance from the flange increases. This error is shown in dashed lines in FIG. 2B, with the greatest magnitude of error occurring at the center of the blade chord (farthest from the marker position 200 in FIG. 2A). This farthest distance on the mold, i.e., the center of the mold relative to the edges, is where the spar cap(s) are positioned—which is one of the most critical (load bearing) components of the blade. This lack of precision can lead to out-of-tolerance positioning of the girders or shear webs 300, as shown in FIG. 2C (where the projection 110 is not oriented vertically, representing the midpoint 300 where the girder ought to be installed, but instead offset at an angle resulting in placement of the girder off-center and thus jeopardizing blade integrity and performance).

Figure 3A:
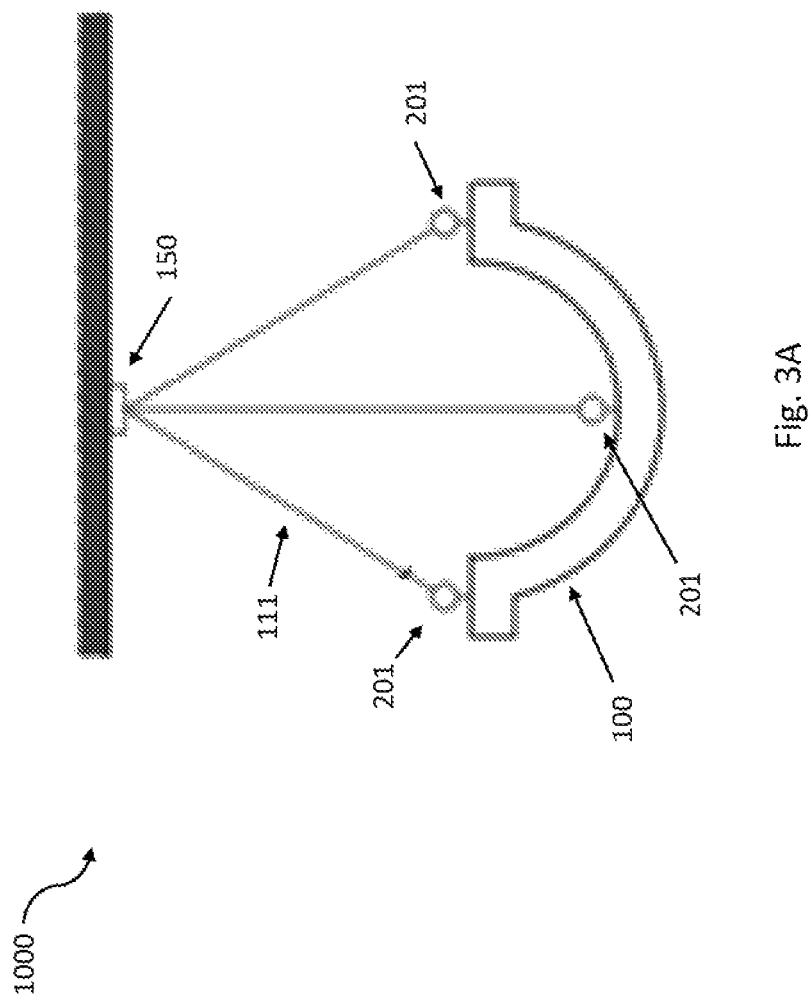
Figure 3B:
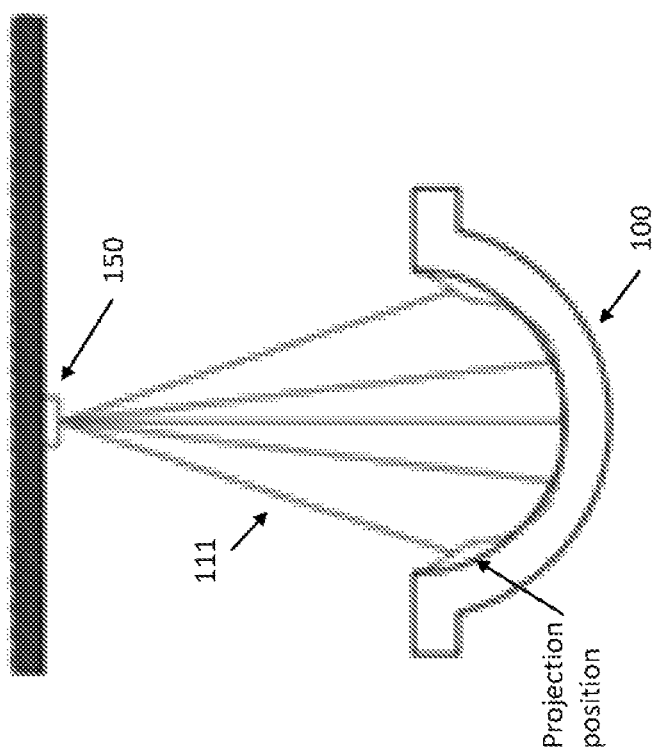

To address this issue, another embodiment of the present disclosure provides an in-mold marker arrangement as shown in FIG. 3A-C. This arrangement of markers can be particularly advantageous at blade sections that are close to the maximum chord of the blade, where the distance from the flanges to the center of the airfoil is significant. The additional marker(s) in the center of the mold, as shown in FIG. 3A, provides an extra reference point in the center of the tool where critical load bearing components are to be placed. As a result, this approach provides enhanced positioning accuracy, as shown by the dashed projection line in FIG. 3B (which largely overlaps with and is obscured by the mold surface line thereby indicating virtual zero error). In various embodiments, there may be a plurality of markers proximate the center of the mold or located at select high priority locations on the mold. In various embodiments, the plurality of markers may trace the location of an internal component to be placed at or circumscribe the location. Note the difference between the projected vs. actual position error from FIG. 2B (no centrally located mold marker 200) as compared to FIG. 3B (with centrally located mold marker). The projected position (dashed line) erroneously skews both above (e.g. at center point) and below the mold surface in a sinusoidal pattern, as shown in 2B, when no central marker (as shown in FIG. 3A) is present. Likewise, the shear web of FIG. 3C (which employs the centrally located marker) is properly located at the center of the blade, whereas the shear web of FIG. 2C is displaced/skewed toward the leading edge of the blade.

In accordance with an aspect of the present disclosure, the internal marker(s) 201 can be removably or releasably attached to the mold 100. For example, the mold 100 can include a first set of reflective optical targets 202 disposed on the mold flanges, and a second set of reflective optical markers 212 located inside the mold, as shown in FIG. 4A. A close-up, cross-sectional view of the first set of reflective optical targets 202 is shown in FIG. 4B, where the target 202 can be received directly within a recess 102 of the mold 100. In various embodiments, an exemplary reflective marker may have a mushroom shape with a bulbous top portion 202a for reflecting the beam from projector 150, and elongated stem 202b for insertion within the mold recess 102. The stem and bulbous portions can be integrally formed, or formed as discrete components that are releasably attached. The stem 202b can be formed with an adjustable (e.g. telescoping) height such that the reflective bulbous portion can be elevated/retracted to a desired height.

The marker(s) 212 may be disposed within the mold interior, each marker 212 may include an anchor member 210 that is integrally formed within the mold, and in some instances, embedded between the inner and outer surfaces of the mold, as shown in FIG. 4D. In some embodiments, the anchor member 210 can be flush with the inner surface of the mold (which imparts the shape to the composite structure formed therein). In various embodiments, the anchor member 210 may include any contour of the mold such that the flush portion of the anchor member 210 does not protrude above the mold surface. In various embodiments, anchor member 210 may be disposed deeper in the mold than the surface, for example the anchor member 210 may be disposed within a cavity within the interior of the mold.

In various embodiments, the anchor member 210 can include a magnet that releasably attaches or couples with the magnetic marker 212 to securely retain the marker 212 in position for calibration of the optical projector 150. In some embodiments the magnets of the anchor 210 are rare earth magnets. Additionally, or alternatively, an electromagnet can be employed if desired. In various embodiments, the magnetic attraction of the anchor member 210 can be selectively or adjustably operated, such that the anchor member 210 can be switched off to release the magnetic marker 212. In various embodiments, anchor member 210 can have a selectively powerful magnet embedded therein, for example a magnet configured to increase its attraction with an increases electric current applied thereto.

The union of the magnetic marker 212 with the magnetic anchor 210 allows for a strong bond between components without creating a recess or void in the interior surface of the mold 100. In various embodiments, the bond may be temporary and releaseable. As shown in cross sectional view of FIG. 4E, the interior surface of the mold is contiguous and has a constant radius of curvature directly above and along the entire width of the anchor 210.

Figure 4E:
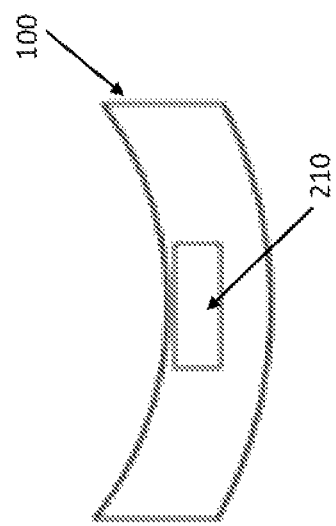
Figure 4C:
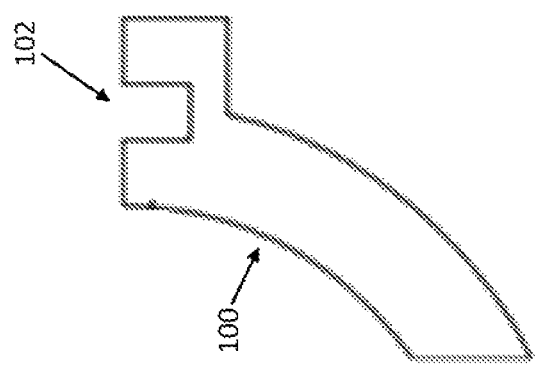

One of the major concerns in implementation of an in-mold marker is the complications that it can potentially create after removing the reflector 212. In side flange marker 202 installations, bushing holes 102 that receive the marker mirrors 202 are outside the edge of the blade and hence do not interfere with the manufacturing process, e.g., resin ingress during vacuum assisted resin transfer (FIG. 4C). However, a similar (male/female mechanical interlock) arrangement for in-mold markers 212 can lead to issues as infusion resin will ingress to any opening/recess inside the mold. To address this issue, a built-in magnetic mounting arrangement, e.g., anchor 210, is provided as shown in FIG. 4E, in this setup, after the marker is removed (post-calibration), the surface of the tool stays intact. In various embodiments, a mechanical interlock can be employed that has integral sealing features such as o-rings and gaskets to avoid ingress of any liquid resins.

The markers 200, 212 may be configured as a separate device or component that is attached to the blade mold 100. Additionally, or alternatively, the internal marker can include a first portion 210 that is integrally formed with the mold, and a removable (and reflective) surface feature 212. The number and location of the markers can vary depending on blade design specifications, e.g., number of spar caps and shear webs, location and size, etc. The distribution of markers need not be uniform but instead concentrated in select areas of the blade. Also, the number, distribution and geometry of the markers can vary along the blade span, e.g., there can be a greater concentration of markers at locations with large/heavy internal components and/or more complex geometry or surface contours, e.g., with a greater number of markers located proximate the root as compared to the tip of the blade.

FIG. 4A-D depicts an exemplary embodiment of markers 202, 212 having a bulbous, e.g., semispherical shape, however markers of alternative geometries (e.g., curved, non-linear) are within the scope of the present disclosure. In some embodiments the markers are configured with a curved surface(s). In various embodiments, the markers may have a compound curved shape, such as a rivet head shape. Additionally, or alternatively, in some embodiments the markers are formed with linear surfaces (e.g. facets). In various embodiments, the faceted markers may have facets that face the one or more optical projectors or another portion of the mold. For example and without limitation, the marker can have any number of facets such as a bolthead. As shown, the retroreflective optical markers 202, 212 placed in/on the mold 100 enable the over-head projection system to confirm and calibrate the digital spatial position of components with the actual physical locations in the mold. In embodiments in which a complete 3-Dimensional (3D) tracking is desired, multiple markers may be included at different points on the mold. Although a single mold half is shown for simplicity, the present disclosure can be employed in both upper and lower mold halves, if desired. In various embodiments, both the upper and lower mold can include the plurality of markers, with one or more projection systems placed overhead or proximate the molds. In various embodiments, the upper and lower mold can be formed facing one another, the projection system placed therebetween and oppositely emitting beams simultaneously.

The coordinates of selected markers are predetermined to accurately support the tracking process. Accordingly, location of the reference markers is first specified in the 3D manufacturing model of the blade mold and are specific to the component geometry as well as the data that is desired to be collected. In order to fabricate the mold (which will be employed to fabricate wind turbine blades), a male "plug" is first formed to serve as the structure which imparts the specified geometry into the mold. During plug build, marker points are formed. In various embodiments, the marker points may be formed in the mold via computer numerically controlled (CNC) machining or another automated method. In various embodiments, the marker points may be formed in the plug via one or more manual procedures, such as a drill press or a manual tool. The optical markers i.e., marker points may be manufactured within the mold during the resin infusion process. The marker anchor 210 locations are thereafter transferred to or imparted within the final mold and can serve as a seat for hosting/receiving retroreflective markers 212.

The reflective magnetic markers 212 can be detached or decoupled from the magnetic anchor 210 manually, by exerting sufficient physical force to overcome the magnetic force. In some embodiments, a plurality of reflective magnetic markers 212 can be coupled to a single/common anchor 210. According to embodiments, magnetic markers 212 may include magnetic anchors 210 configured for use with electromagnets. The electromagnets may be configured to generate a magnetic field when subjected to an electric current. The electromagnets may be configured to lose their magnetic field when the electric current is cut off, thereby releasing the magnetic anchor 210 and therefore magnetic marker 212.

After the markers 212 are removed (at least from the interior portions of the mold cavity) the blade layup segments can be deposited, while the anchor members 210 remain fixed within the mold 100, and a resin infusion process can be performed (while the anchor member 210 remains within the mold 100, below the layup segments and resin). As described above, the sealed anchor 210 does not present any crevices or openings for undesired resin ingress. Thereafter, the mold closure operation commences (i.e., a lower mold containing a half blade, and an upper mold containing a half blade, are rotated together to form a complete blade).

The tracking system disclosed herein allows for the identification (and thus correction) of discrepancies between the digital mold/blade design with the actual physical mold/blade reference point location(s), thus preventing misalignment of various component parts during blade assembly. Also, the tracking system disclosed herein allows for the calibration/verification (and thus correction) of misalignment of a blade model geometry about multiple axes or reference planes and datum. In some embodiments, the overhead laser can: i) detect a discrepancy between the digital reference locations and physical marker locations; and ii) provide corrective instruction, e.g., project the correct placement by superimposing visual (and audio) aids to cue the operator how far and in what direction to shift the digital marker location to the correct position. In various embodiments, one or more visual aids such as arrows or dotted lines may be projected. As discussed herein above, the projection device need not utilized lasers or be overhead as in exemplary embodiments described.

The projection coordinates can be electronically, visually, or optically sent to all optical projectors, or in some embodiments only select projectors (e.g., root marker projection locations sent to only those optical projectors which reside above the root section of the mold/blade). Also, the projection files can include a key (e.g., prefix or suffix, similar to addressing of Internet Protocol packets) which signals that two particular projection files are to be maintained in a consecutive manner as they are directed to adjacent panels within the mold. In various embodiments, one or more users and/or computers can identify which coordinates to send to which optical projectors, for example root data may be sent to a root optical projector. In another example, root data can be sent to one or more mid-span projectors, depending on the application of one or more During the core placement process on the shop floor, the projected laser lines are used to identify the structures/surfaces that are deviating from the model. In some embodiments the identification of deviation can be performed automatically (e.g., one or more cameras, such as an optical camera operating in any band of the electromagnetic spectrum) with predefined acceptable tolerance ranges. Additionally, or alternatively, the identification of deviation can be performed (or confirmed, if initially performed automatically) via manual inspection by the operator. When a deviation beyond the acceptable limits is identified, the digital marker or physical marker can be repositioned, or discarded, as desired. In various embodiments, the deviation can be visually assessed by one or more optical markers, such as a laser or reflection. Also, an alert can be signaled if and/or when a deviation exceeds the acceptable tolerance to highlight and/or flag this deviation. In some embodiments a confirmation that the deviation has been addressed must be entered in order for a subsequent projection pattern to be projected.

The magnitude of acceptable error/deviation can depend on the materials employed, and the operating environment for a given blade. In some embodiments the acceptable error, or tolerance, can vary along and across the blade location. For example, the acceptable tolerance, or range deviation, can be smaller at locations of material transition and/or thickness transitions, as well as along the leading and trailing edges.

In the exemplary embodiment shown, a series of lasers are positioned above the wind turbine mold and project patterns downward onto the mold during the manufacturing process. The number of laser projectors depends on the length of the blade as well as the height of the projectors with respect to the mold surface. The position of projectors in this exemplary embodiment may be fixed but can include Galvo-driven mirrors built in to each projector, such that the one or more laser beam reflections are moveable to create the 3D contours. While the lasers shown are independently mounted in a fixed position, alternative configurations are contemplated in which all or a subset of laser projectors are capable of relative movement with respect to each other. For example, a laser projector can adjust its vertical position with respect to the blade mold, e.g., descend from the ceiling to be positioned closer to the mold, so as to provide a more focused line of higher resolution. In various embodiments, one or more of the projectors may be disposed on gimbals, robotic arms, non-robotic arms with articulating joints, or the like. In various embodiments, the one or more projectors may be positioned automatically or manually relative to the mold. The projectors can be programmed with predefined patterns for projection onto the blade mold (and/or any layup materials that may be disposed therein). Each blade design can require a distinct projection pattern, and thus a unique program inputted into the projection system.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

What is claimed is:

1. A method for fabrication of a composite structure, comprising:
providing a mold configured for forming a composite structure;
providing at least one magnetic anchor, the at least one magnetic anchor disposed within the mold;
providing at least one optical marker, the optical marker magnetically coupled to the at least one magnetic anchor;
providing an optical projector, the optical projector projecting at least one optical beam directed towards at least one optical marker;
receiving at least one reflective beam from the at least one optical projector to identify the location of the optical marker disposed on the mold;
calibrating the optical projector by comparing a predetermined virtual optical marker location to the identified optical marker location.

2. The method of claim 1, further comprising removing the at least one optical marker from the magnetic anchor.

3. The method of claim 1, further comprising depositing a plurality of layup segments within the mold after the at least one optical marker is removed.

4. The method of claim 3, further comprising injecting resin through the plurality of layup segments after the at least one optical marker is removed.

5. The method of claim 3, wherein at least one layup segment of the plurality of layup segments is disposed above the magnetic anchor.

6. The method of claim 1, wherein the composite structure is a wind turbine blade.

7. The method of claim 1, wherein the at least one magnetic anchor is disposed at a flange of a leading edge of the wind turbine blade.

8. The method of claim 1, wherein the at least one magnetic anchor is disposed at a midpoint of a blade chord.

9. The method of claim 1, wherein the at least one magnetic anchor is disposed at a blade location that coincides with a spar cap.

10. The method of claim 1, wherein a plurality of magnetic anchors are provided, the plurality of magnetic anchors disposed in the mold at locations that coincide with a maximum blade chord length.

11. The method of claim 1, wherein a plurality of optical markers are disposed between the leading and trailing edge of the blade.

12. The method of claim 1, wherein the at least one magnetic anchor is disposed under the surface of the mold.

13. The method of claim 1, wherein the at least one optical marker is configured as a mirror.

14. The method of claim 1, further comprising, when the comparison of the predetermined digital optical marker location(s) and the identified physical optical marker location do not match, adjusting the predetermined digital optical marker location(s).

15. The method of claim 1, wherein projecting is performed by a plurality of lasers.

16. The method of claim 15, wherein the plurality of lasers are configured for relative movement with respect to the mold.

17. The method of claim 15, wherein the plurality of lasers are configured for relative movement with respect to each other.

18. The method of claim 15, wherein a plurality of optical beams are projected simultaneously towards a plurality of optical markers.

19. The method of claim 15, wherein select beams of the plurality of optical beams are projected in a serial fashion.

20. The method of claim 6, further comprising removing the at least one optical marker from the wind turbine blade surface prior to closing a first mold half onto a second mold half.

* * * * *